United States Patent
Tanimoto (10) Patent No.: US 7,259,611 B2
(45) Date of Patent: Aug. 21, 2007

(54) STEP-UP / STEP-DOWN CIRCUIT (75) Inventor: Takashi Tanimoto, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 247 days.

(21) Appl. No.: 11/153,745

(22) Filed: Jun. 15, 2005

(65) Prior Publication Data
US 2005/0285577 A1  Dec. 29, 2005

(30) Foreign Application Priority Data
Jun. 29, 2004 (JP) ............................. 2004-190654

(51) Int. Cl.
G05F 1/10 (2006.01)
(52) U.S. Cl. ........................ 327/536; 363/59; 363/60
(58) Field of Classification Search ................ 327/536; 363/59, 60
See application file for complete search history.

(56) References Cited

U.S. PATENT DOCUMENTS 5,940,284 A * 8/1999 Troutman ..................... 363/60

6,359,947 B1 * 3/2002 Rao ........................... 375/374

FOREIGN PATENT DOCUMENTS

JP    2001-218118    8/2001

* cited by examiner

Primary Examiner—Kenneth B. Wells
(74) Attorney, Agent, or Firm—Hogan & Hartson LLP (57) ABSTRACT A step-up/step-down circuit can be simplified as compared with conventional circuits by including a step-down unit for receiving a system clock pulse alternately providing a reference voltage (GND) and a system voltage $V_{DD}$ in a repeated manner to output a voltage $V_4$ lower than the reference voltage (GND) by using a potential difference between the reference voltage (GND) and the system voltage $V_{DD}$, a level shift unit for receiving the system clock pulse and the voltage $V_4$ output from the step-down unit to output a pulse signal $V_o$ having a greater potential difference than the potential difference between the reference voltage (GND) and the system voltage VDD, and a step-up unit for receiving the pulse signal $V_o$ output from the level shift unit to output a voltage $V_7$ higher than the reference voltage (GND).

6 Claims, 8 Drawing Sheets

Fig. 1

Fig. 2A  SYSTEM CLOCK PULSE

Fig. 2B  POTENTIAL OF STEP-DOWN UNIT

Fig. 2C  OUTPUT OF SHIFT REGISTER

Fig. 2D  POTENTIAL OF STEP-UP UNIT

Related Art

Related Art

Fig. 8

STEP-UP / STEP-DOWN CIRCUIT

CROSS-REFERENCE TO RELATED APPLICATION

The entire disclosure of Japanese Patent Application No. 2004-190654 including the specification, claims, drawings, and abstract is incorporated herein by reference.

BACKGROUND OF THE INVENTION

1. Field of the Invention

The present invention relates to a step-up/step-down circuit with a simplified circuit configuration.

2. Description of the Related Art

Photoelectric conversion devices including photoelectric conversion elements have come to be widely used in recent years. Because devices are often incorporated into portable terminal devices, such as mobile phones, reduction in size of not just the photoelectric conversion devices, but also of peripheral power supply circuits, is desired.

For vertical and horizontal transfer and output of information electric charges produced in accordance with incident light, photoelectric conversion devices having a CCD solid-state image sensing element require a predetermined transfer clock pulse to be applied to vertical and horizontal transfer registers, a gate electrode, and a transfer electrode in an output unit. A crest value of such a pulse, i.e. a pulse voltage, is set at a predetermined voltage level by stepping up or down the voltage of a system clock of the photoelectric conversion device.

Figure 5:
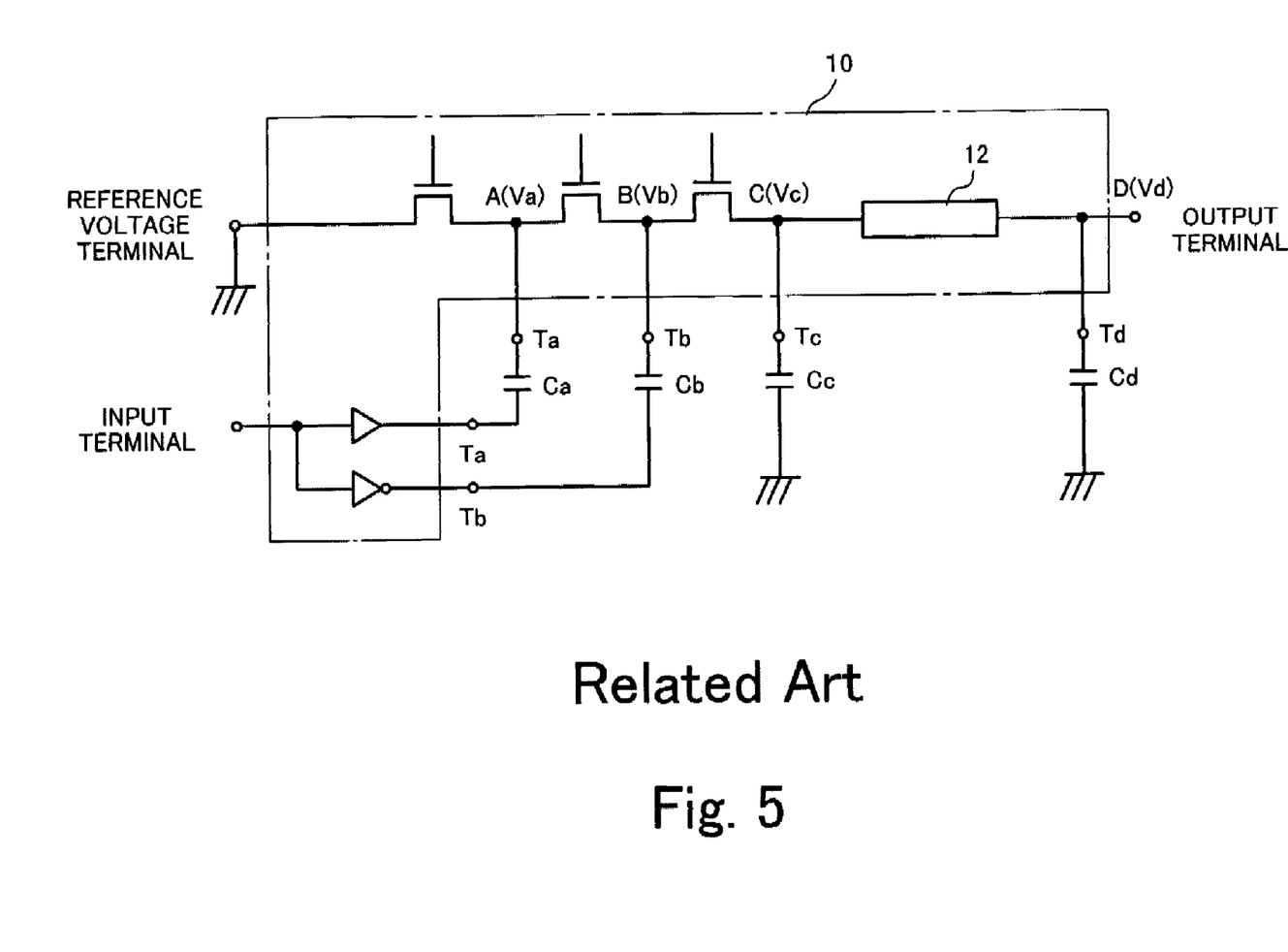
FIG. 5 shows a step-down circuit in a background art.
Figure 6:
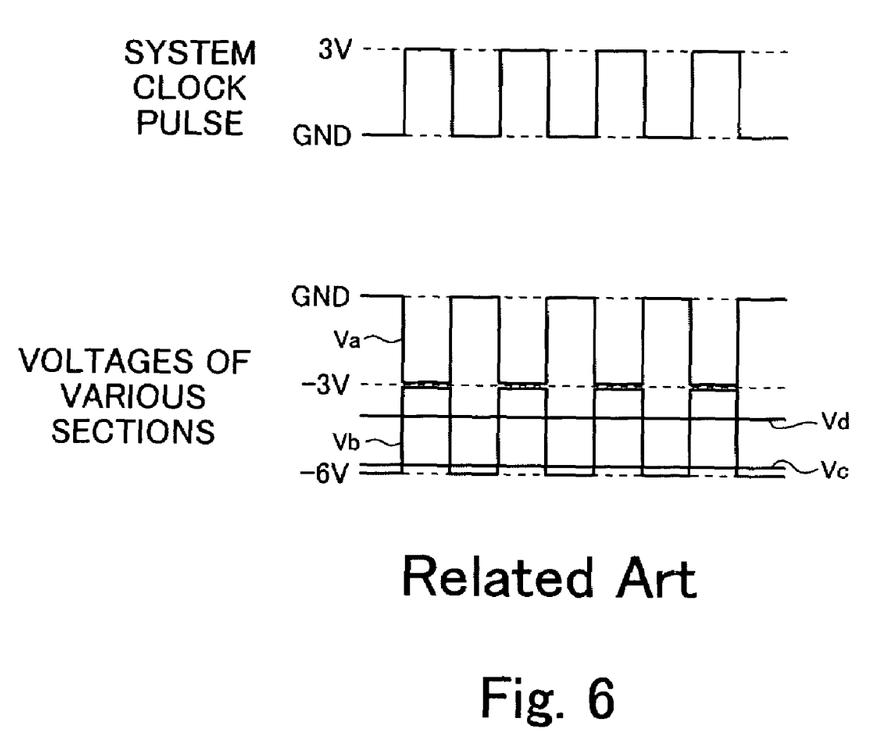
FIG. 6 shows voltages of various sections in the step-down circuit in the background art.
Figure 7:
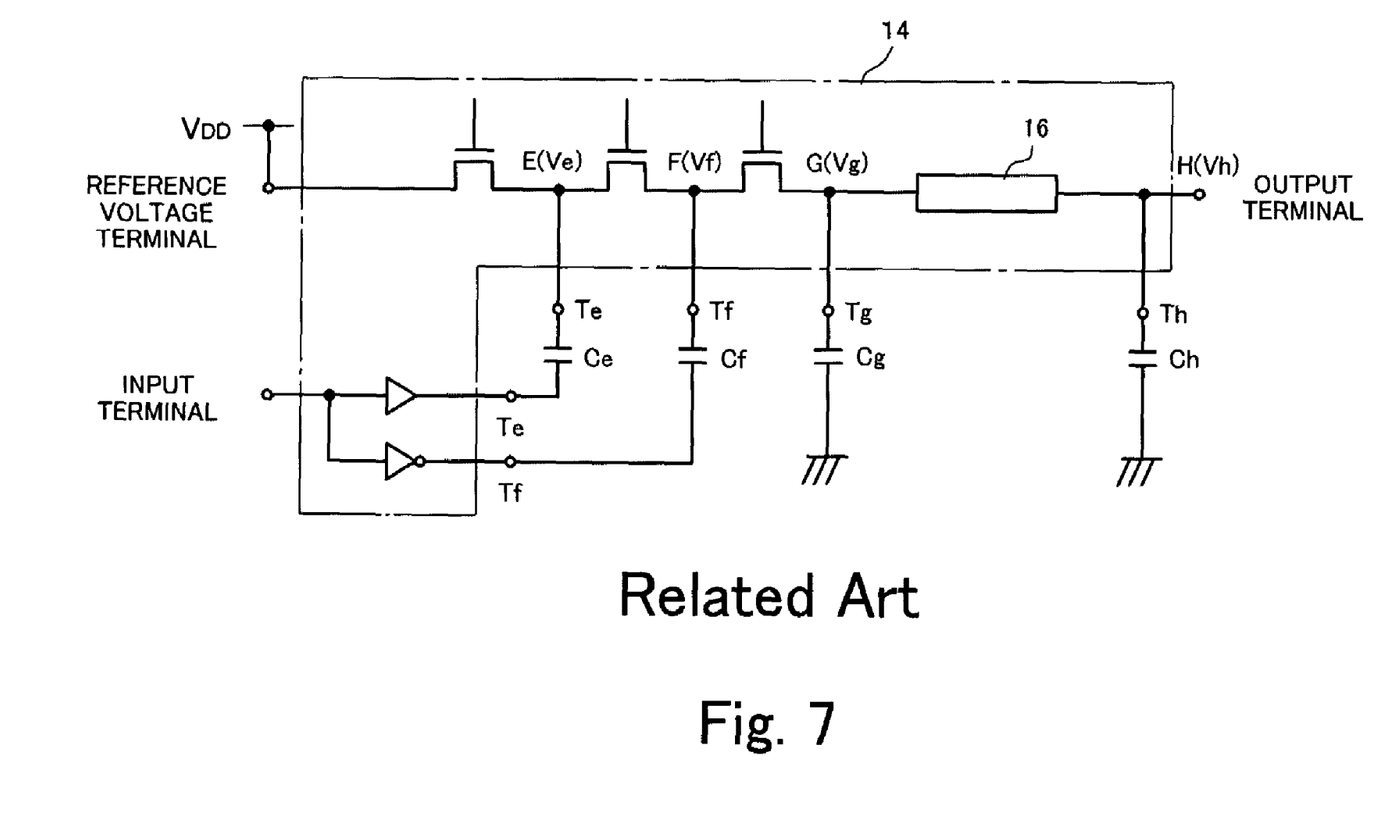
FIG. 7 shows a step-up circuit in the background art.
Figure 8:
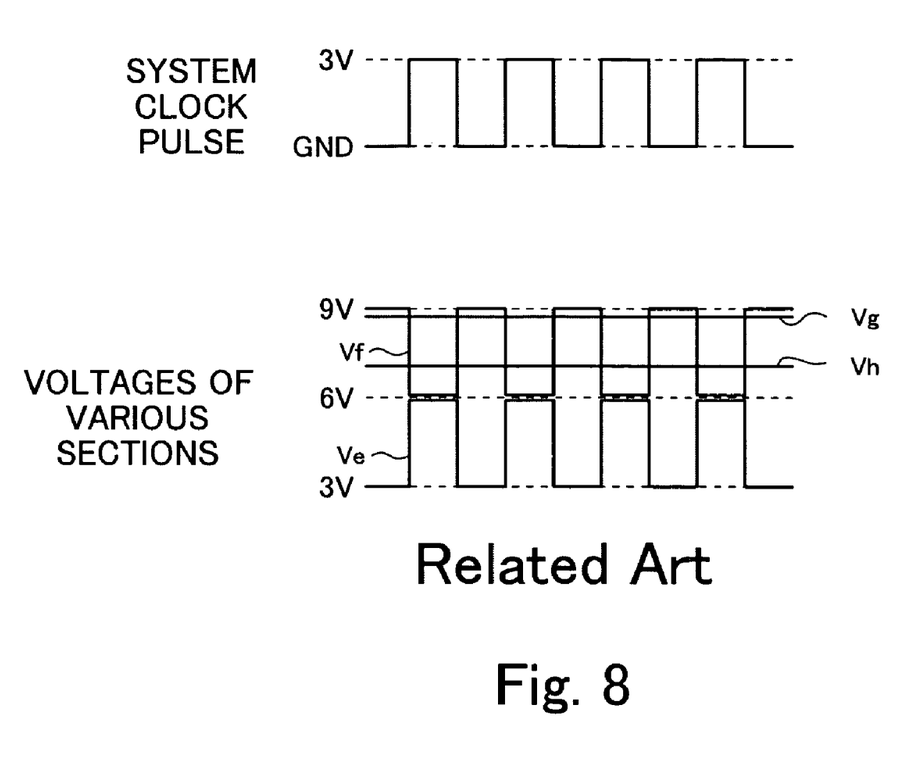
FIG. 8 shows voltages of various sections in the step-up circuit in the background art.

The photoelectric conversion device having the CCD solid-state image sensing element generally uses a system clock pulse of 0-3 V. The transfer clock pulse is produced by boosting or bucking the voltage of the system clock pulse. A step-down circuit includes a charge pump circuit as shown in FIG. 5. A main circuit unit 10 is formed as a semiconductor element. Often, capacitors Ca-Cd included in the step-down circuit are connected to external terminals Ta-Td outside the main circuit unit 10. In such a step-down circuit, a reference voltage terminal is connected to ground, and the system clock pulse of 0-3 V is applied to an input terminal, thereby obtaining potentials Va-Vd at connection nodes A-D, respectively, as shown in FIG. 6. More specifically, the voltage is reduced from the reference ground potential (GND) through the two-stage charge pump action, and the potential Vc of approximately −6 V is applied to a regulator 12, so that the regulator 12 can produce the output voltage Vd of approximately −4 V. On the other hand, a step-up circuit also includes a charge pump circuit as shown in FIG. 7 similarly to the step-down circuit. A main circuit unit 14 is formed as a semiconductor element. Capacitors Ce-Ch included in the step-up circuit are often connected to external terminals Te-Th outside the main circuit unit 14. In this step-up circuit, a system voltage $V_{DD}$ of 3 V is supplied to a reference voltage terminal, and the system clock pulse of 0-3 V is applied to an input terminal, thereby obtaining potentials Ve-Vh at connection nodes E-H, respectively, as shown in FIG. 8. More specifically, the voltage is boosted from the reference system voltage $V_{DD}$ through the two-stage charge pump action, and the potential Vg of approximately 9 V is supplied to a regulator 16, which converts the potential Vg into the output voltage Vh of approximately 7 V, and outputs the converted voltage.

Conventional step-down and step-up circuits such as those described above are generally formed as completely independent circuits for producing the desired output voltages Vd and Vh from the system clock pulse, a large number of components are required for the step-up/step-down circuits, thereby increasing the scale and size of the circuit. In addition, because a large number of external terminal pins for connecting to the capacitors Ca-Ch are required, the area occupied by pad electrodes for extracting the external terminals in the step-up/step-down circuit is increased, preventing further reduction in size of the photoelectric conversion circuit.

SUMMARY OF THE INVENTION

The present invention provides a step-up/step-down circuit comprising a step-down unit for receiving a system clock pulse alternately providing a reference voltage and a first voltage different from the reference voltage in a repeated manner, and supplying a second voltage lower than the reference voltage by using a potential difference between the reference voltage and the first voltage, a level shift unit for receiving the system clock pulse and the second voltage supplied from the step-down unit, and supplying a pulse having a potential difference greater than the potential difference between the reference voltage and the first voltage, and a step-up unit for receiving the pulse supplied from the level shift unit, and supplying a third voltage higher than the reference voltage.

The present invention also provides a step-up/step-down circuit comprising a step-up unit for receiving a system clock pulse alternately providing a reference voltage and a first voltage different from the reference voltage in a repeated manner, and supplying a second voltage higher than the reference voltage by using a potential difference between the reference voltage and the first voltage, a level shift unit for receiving the system clock pulse and the second voltage supplied from the step-up unit, and supplying a pulse having a potential difference greater than the potential difference between the reference voltage and the first voltage, and a step-down unit for receiving the pulse supplied from the level shift unit, and supplying a third voltage lower than the reference voltage.

BRIEF DESCRIPTION OF THE DRAWINGS

Preferred embodiments of the present invention will be described in further detail based on the following drawings, wherein.

DESCRIPTION OF THE PREFERRED EMBODIMENT

Figure 1:
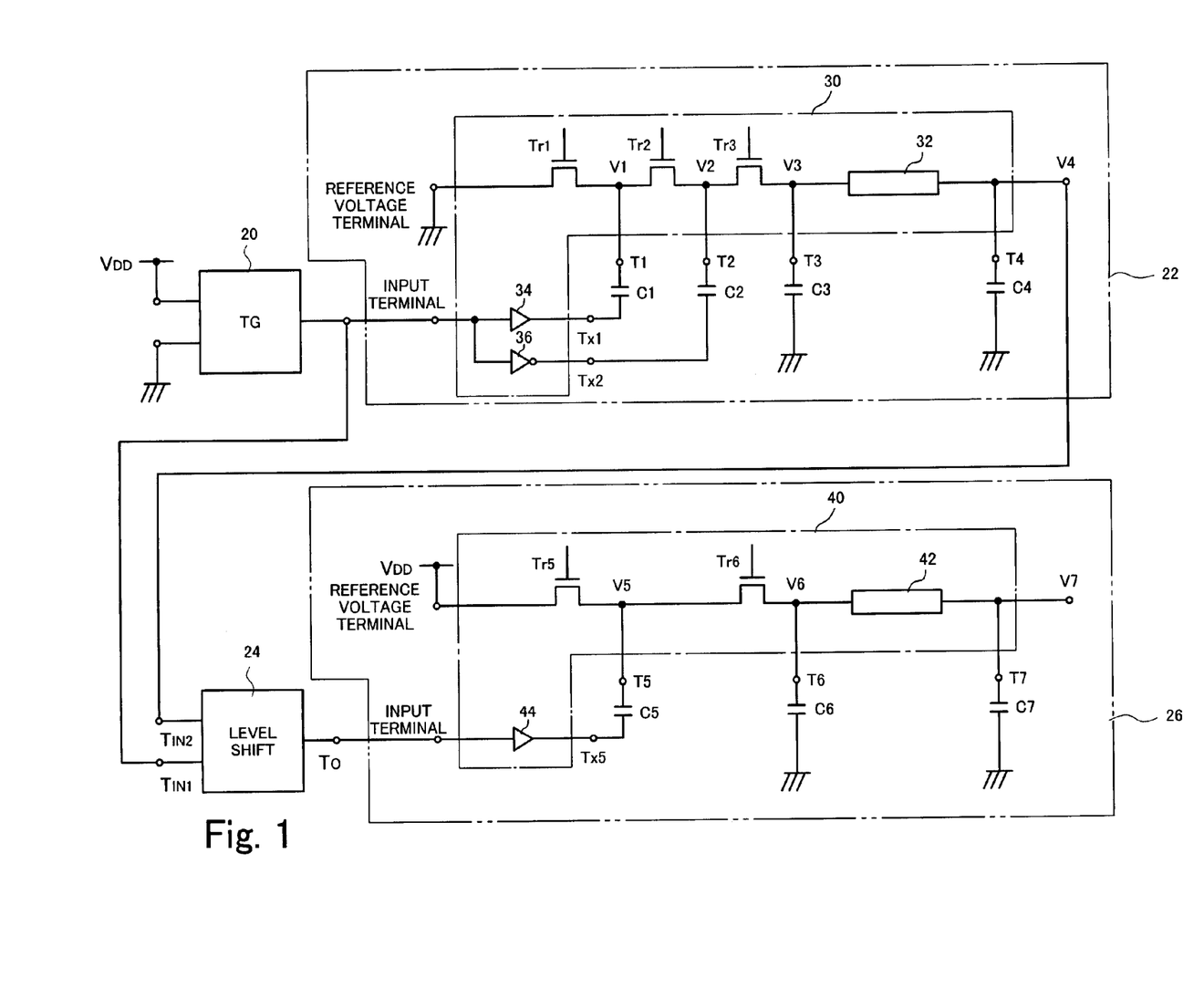
FIG. 1 shows a configuration of a step-up/step-down circuit according to an embodiment of the present invention.

A step-up/step-down circuit according to an embodiment of the present invention includes a timing generator (TG) 20, a step-down unit 22, a level shift unit 24, and a step-up unit 26, as shown in FIG. 1.

The timing generator 20 is a circuit receiving a system voltage $V_{DD}$ of a photoelectric conversion device or the like as an input voltage, and generating a system clock pulse $f_s$. When, for example, the system voltage $V_{DD}$ is 3 V, the system clock pulse $f_s$ repeatedly alternating between a ground voltage (GND), which is a reference voltage, and the system voltage $V_{DD}$ in a predetermined cycle is produced. The timing generator 20 is configured similarly to commonly-used clock generation circuits, and therefore will not be described here in this specification. An output terminal of the timing generator 20 is connected to the step-down unit 22 and an input terminal $T_{IN1}$ of the level shift unit 24. As a result, the system clock pulse $f_s$ is supplied to input terminals of the step-down unit 22 and the level shift unit 24.

The step-down unit 22 is configured similarly to the conventional step-down circuit, and includes a main unit 30 formed on a semiconductor substrate, and capacitors $C_1$-$C_4$ connected to the main unit. The main unit 30 and the capacitors $C_1$-$C_4$ form a charge pump circuit.

The configuration of the main unit 30 according to the present embodiment will be specifically described. A reference voltage terminal receiving the reference voltage, which is a reference for voltage step-down, is connected to an external terminal $T_1$ through a source and a drain of a switching element $Tr_1$. A connection node between the external terminal $T_1$ and the switching element $Tr_1$ is connected through a source and a drain of a switching element $Tr_2$ to an external terminal $T_2$. A connection node between the external terminal $T_2$ and the switching element $Tr_2$ is connected through a source and a drain of a switching element $Tr_3$ to an external terminal $T_3$. A connection node between the external terminal $T_3$ and the switching element $Tr_3$ is connected to an input terminal of a regulator 32, whose output terminal, i.e. an output terminal of the step-down unit 22, is connected to an external terminal $T_4$. On the other hand, the input terminal of the step-down unit 22 is connected to input terminals of a buffer element 34 and of an inverting element 36. An output terminal of the buffer element 34 is connected to an external terminal $T_{x1}$, and an output end of the inverting element 36 is connected to an external terminal $T_{x2}$.

The capacitors $C_1$-$C_4$ are connected to the external terminals $T_1$-$T_4$ and $T_{x1}$ and $T_{x2}$ outside the main unit 30. The capacitor $C_1$ is connected between the external terminals $T_1$ and $T_{x1}$. The capacitor $C_2$ is connected between the external terminals $T_2$ and $T_{x2}$. The capacitor $C_3$ has one end connected to the external terminal $T_3$, and the other end connected to ground. The capacitor $C_4$ has one end connected to the external terminal $T_4$, and the other end connected to ground. The reference voltage terminal is connected to ground, and the input terminal is connected to the output terminal of the timing generator 20. The capacitances of the capacitors $C_1$-$C_4$ are preferably determined based on a load capacitor connected to the external terminal $T_4$, the required response time, and the like.

Figure 2A:
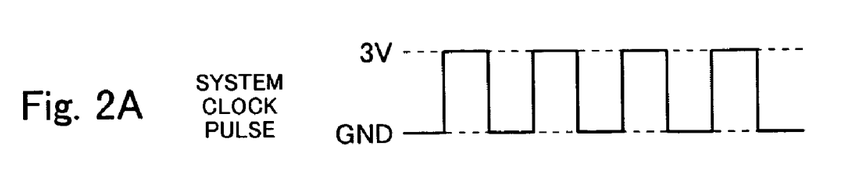
FIGS. 2A-2D show voltages of various sections in the step-up/step-down circuit according to the embodiment of the present invention.
Figure 2B:
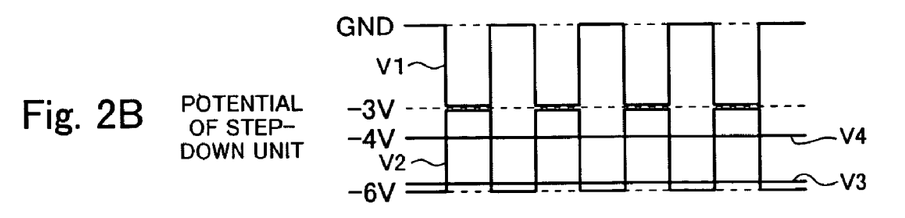

The system clock pulse $f_s$ of 0-3 V is supplied from the timing generator 20 to the input terminal of the step-down unit 22 to switch the switching elements $Tr_1$-$Tr_3$, thereby stepping down the voltage of the system clock pulse $f_s$, as illustrated in the graph of FIG. 2B. For example, a pulsed potential $V_1$ for alternately supplying the ground potential (GND) and approximately −3 V is achieved at the external terminal $T_1$. A pulsed potential $V_2$ for alternately supplying, for example, approximately −3 V and approximately −6 V is achieved at the external terminal $T_2$. At the external terminal $T_3$, a fixed potential $V_3$ of, for example, approximately −6 V is obtained, and this potential $V_3$ is supplied to the regulator 32. Consequently, as an output of the regulator 32, a voltage $V_4$ of, for example, approximately −4 V is supplied to the external terminal $T_4$.

The level shift unit 24 includes a level shift circuit formed on a semiconductor substrate. While the level shift circuit can be formed, for example, as a circuit illustrated in FIG. 3, its configuration is not limited to that described above.

Figure 3:
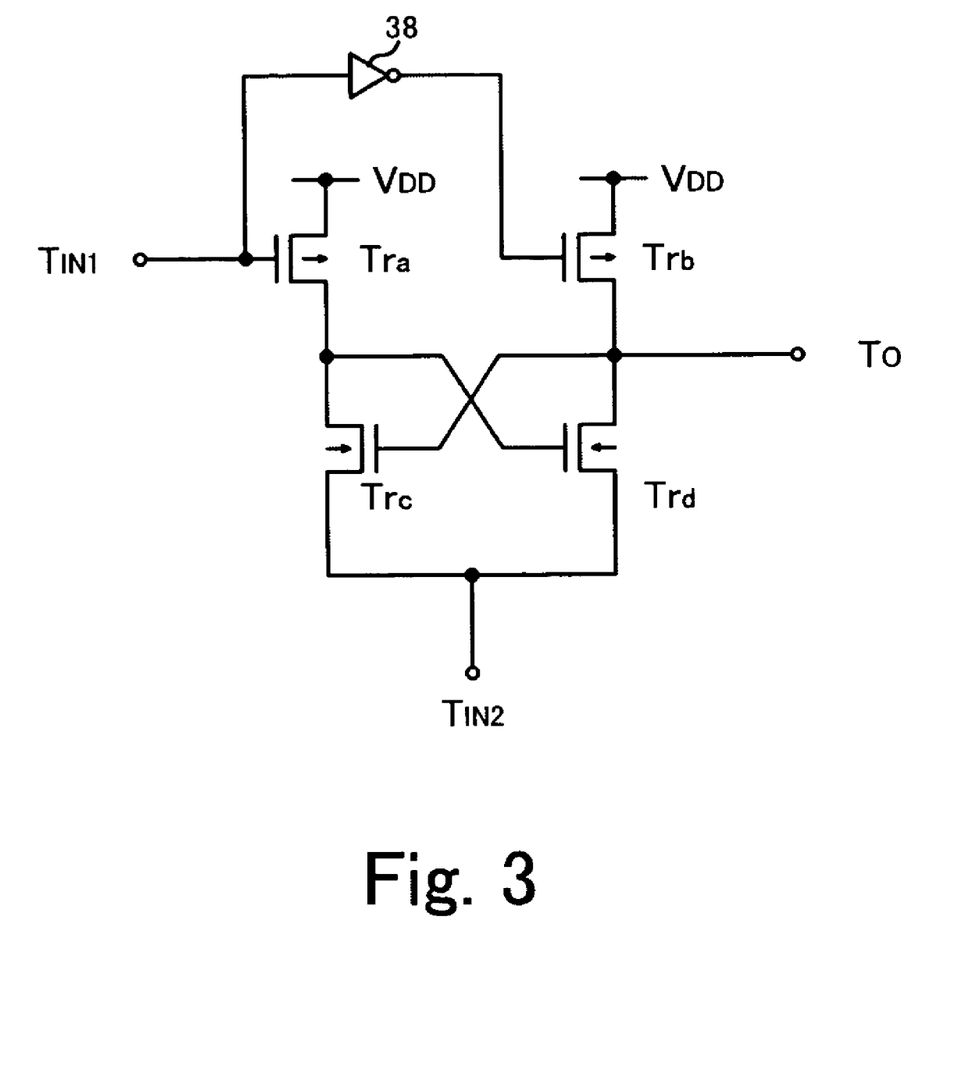
FIG. 3 is a circuit diagram showing a configuration example of a level shift unit according to the embodiment of the present invention.

The input terminal $T_{IN1}$ is connected to a gate of a transistor $Tr_a$ of a first conductivity type, and to an input terminal of an inverting element 38, whose output terminal is connected to a gate of a transistor $Tr_b$ of the first conductivity type. Sources of the transistors $Tr_a$ and $Tr_b$ receive the system voltage $V_{DD}$. Drains of the transistors $Tr_a$ and $Tr_b$ are connected to drains of transistors $Tr_c$ and $Tr_d$ of a second conductivity type, and to gates of the transistors $Tr_d$ and $Tr_c$, respectively. The input terminal $T_{IN2}$ is connected to sources of the transistors $Tr_c$ and $Tr_d$. An output terminal $T_o$ is drawn from the drain of the transistor $Tr_d$.

Figure 2C:
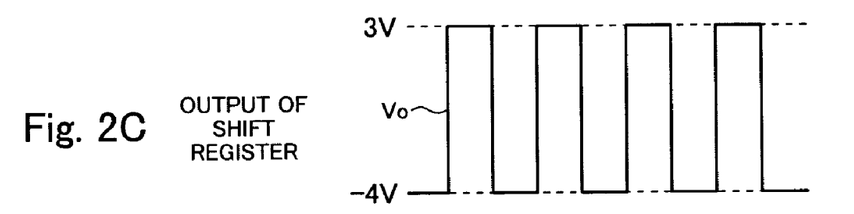

In such a level shift circuit, the system clock pulse $f_s$ is supplied from the timing generator 20 to the input terminal $T_{IN1}$, and the output voltage $V_4$ is supplied from the step-down unit 22 to the input terminal $T_{IN2}$. Consequently, as illustrated in the graph of FIG. 2C, a pulse signal $V_o$ having a larger potential difference than that of the system clock pulse $f_s$, i.e. a pulse signal alternately providing the voltage $V_4$ supplied to the input terminal $T_{IN2}$ and the system voltage $V_{DD}$, is output from the output terminal $T_o$. For example, in the present embodiment, the voltage of approximately −4 V and the voltage of approximately 3V are alternately supplied in a repeated manner.

The step-up unit 26 includes a main unit 40 formed on a semiconductor substrate, and capacitors $C_5$-$C_7$ connected to the main unit. The main unit 40 and the capacitors $C_5$-$C_7$ form a charge pump circuit. By providing the step-down unit 22 in the preceding stage, and achieving the pulse signal $V_o$ with a greater potential difference between an ON voltage and an OFF voltage than the system clock pulse $f_s$ through the level shift circuit, the number of stages of the charge pump circuit in the step-up unit 26 is decreased from that of the conventional circuit.

A configuration of the main unit 40 according to the present embodiment will be specifically described. A reference voltage terminal receiving a reference voltage used as a reference for voltage increase is connected to an external terminal $T_5$ through a source and a drain of a switching element $Tr_5$. A connection node between the external terminal $T_5$ and the switching element $Tr_5$ is connected to an external terminal $T_6$ through a source and a drain of a switching element $Tr_6$. A connection node between the external terminal $T_6$ and the switching element $Tr_6$ is connected to an input terminal of a regulator 42, whose output terminal, i.e. an output terminal of the step-up unit 26, is connected to an external terminal $T_7$. An input terminal of the step-up unit 26 is connected to an input terminal of a buffer element 44, whose output terminal is connected to an external terminal $T_{x5}$.

The capacitors $C_5$-$C_7$ are connected to the external terminals $T_5$-$T_7$ and $T_{x5}$ outside the main unit 40. The capacitor $C_5$ is connected between the external terminals $T_5$ and $T_{x5}$. The capacitor $C_6$ has one end connected to the external terminal $T_6$, and the other end connected to ground. The capacitor $C_7$ has one end connected to the external terminal $T_7$, and the other end connected to ground. The system voltage $V_{DD}$ is applied to the reference voltage terminal, and the output from the level shift unit 24 is supplied to the input terminal. The capacitances of the capacitors $C_5$-$C_7$ are preferably determined based on a load capacitor connected to the external terminal $T_7$, required response time, and the like.

Figure 2D:
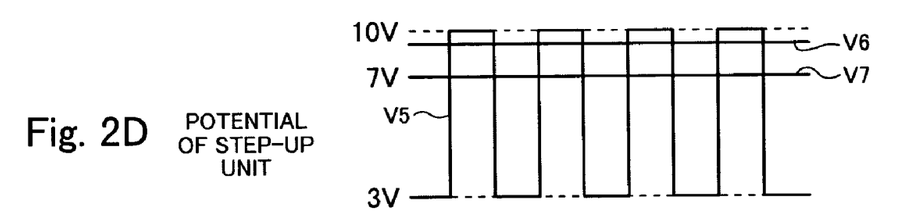

By switching the switching elements $Tr_5$-$Tr_6$, the step-up unit 26 steps up the pulse signal $V_o$ of the level shift unit 24 as illustrated in the graph of FIG. 2D. For example, a voltage $V_5$ equals the reference system voltage $V_{DD}$ plus the pulse signal $V_o$ from the level shift unit 24, i.e. alternating voltages of approximately +3 V and +10 V, emerges at the external terminal $T_5$. Subsequently, a voltage $V_6$ of, for example, approximately +10 V, obtained by smoothing the voltage $V_5$ emerges at the external terminal $T_6$. To the output end terminal of the regulator 42, a voltage of $V_7$ of approximately +7 V obtained by reducing the voltage $V_6$ is supplied.

As described above, by using the step-up/step-down circuit of the present embodiment, an output voltage of approximately −4 V and an output voltage of approximately +7 V can be obtained from the step-down unit 22 and the step-up unit 26, respectively.

The timing generator 20 of the step-up/step-down circuit, the main unit 30 of the step-down unit 22, the level shift unit 24, and the main unit 40 of the step-up unit 26 can be formed on the same semiconductor substrate as a single semiconductor element.

In the step-up/step-down circuit of the present embodiment, the number of stages of the charge pump circuit in the step-up unit 26 can be decreased as compared to the conventional circuit by supplying the output of the step-down unit 22 to the level shift unit 24. Such a decrease in number of stages of the charge pump circuit contributes to a decrease in number of capacitors externally connected to the step-up unit 26. That is, the circuit configuration of the step-up/step-down circuit can be simplified. The area occupied by the newly added level shift unit 24 is smaller than the area where the eliminated capacitor is disposed, and the area occupied by the pad electrode for extracting the external terminal to be connected to the capacitor can also be reduced. As a result, the step-up/step-down circuit can be reduced in size as compared with the conventional circuit.

In addition, because the number of externally connected capacitors is reduced, the manufacturing process can also be simplified. Reliability of the step-up/step-down circuit can also be enhanced, and photoelectric conversion devices and the like using such a step-up/step-down circuit can be downsized.

Figure 4:
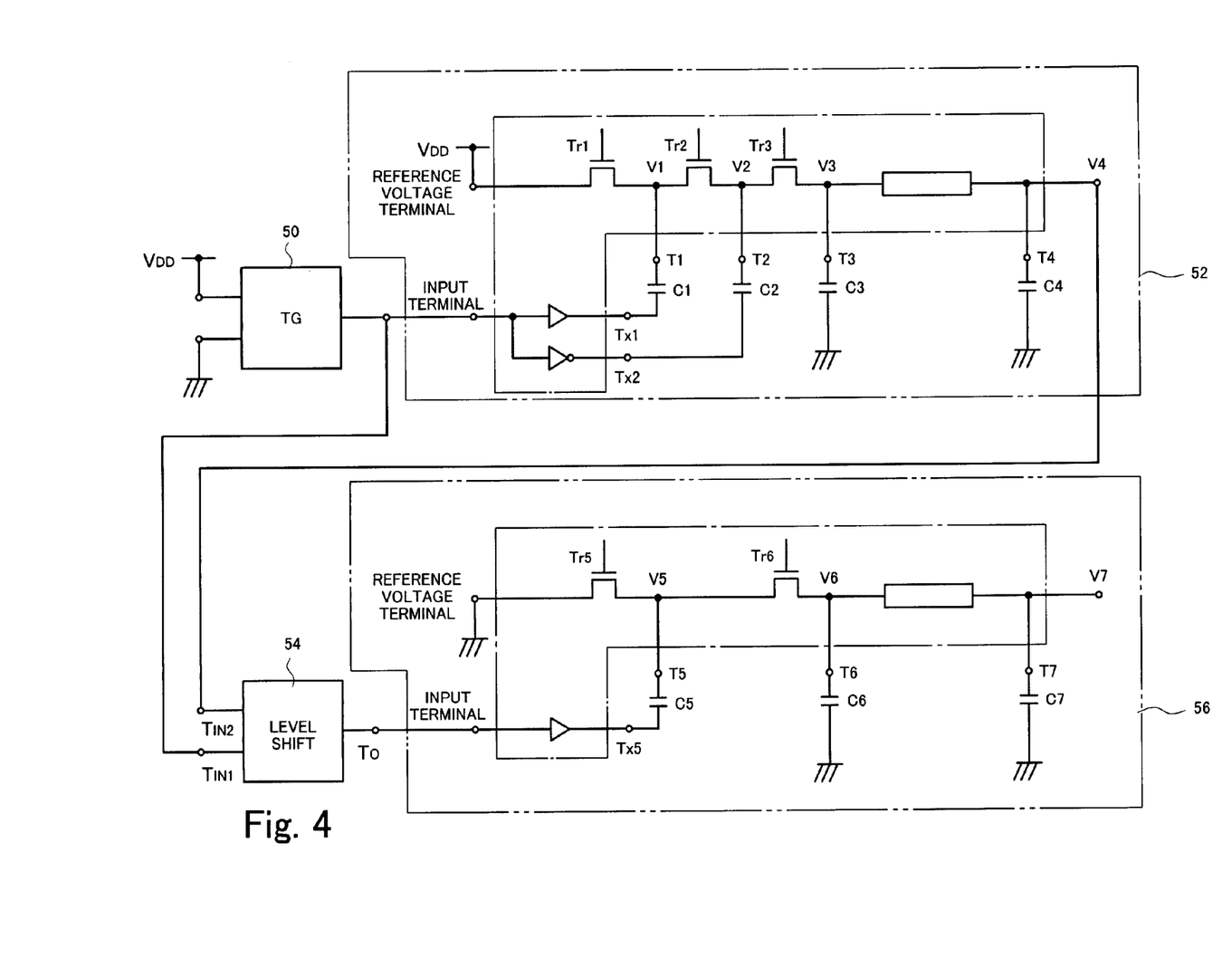
FIG. 4 shows another configuration example of the step-up/step-down circuit according to the embodiment of the present invention.

While the step-down unit 22 and the step-up unit 26 are disposed in the preceding and succeeding stages, respectively, in the present embodiment, the configuration is not limited thereto. For example, as illustrated in FIG. 4, a step-up unit 52 may be disposed in a preceding stage, so that an output of the step-up unit 52 is shifted by a level shift unit 54, and that an output from the level shift unit 54 can be stepped down by a step-down unit 56 in a succeeding stage.

What is claimed is:

1. A step-up/step-down circuit, comprising:
   a step-down unit for receiving a system clock pulse alternately providing a reference voltage and a first voltage different from the reference voltage in a repeated manner, and supplying a second voltage lower than the reference voltage by using a potential difference between the reference voltage and the first voltage;
   a level shift unit for receiving the system clock pulse and the second voltage supplied from the step-down unit, and supplying a pulse having a potential difference greater than the potential difference between the reference voltage and the first voltage; and
   a step-up unit for receiving the pulse supplied from the level shift unit, and supplying a third voltage higher than the reference voltage.

2. A step-up/step-down circuit, comprising:
   a step-up unit for receiving a system clock pulse alternately providing a reference voltage and a first voltage different from the reference voltage in a repeated manner, and supplying a second voltage higher than the reference voltage by using a potential difference between the reference voltage and the first voltage;
   a level shift unit for receiving the system clock pulse and the second voltage supplied from the step-up unit, and supplying a pulse having a potential difference greater than the potential difference between the reference voltage and the first voltage; and
   a step-down unit for receiving the pulse supplied from the level shift unit, and supplying a third voltage lower than the reference voltage.

3. The step-up/step-down circuit according to claim 1, wherein
   the step-down unit or the step-up unit includes a charge pump circuit.

4. The step-up/step-down circuit according to claim 2, wherein
   the step-down unit or the step-up unit includes a charge pump circuit.

5. The step-up/step-down circuit according to claim 3, wherein
   a part of the charge pump circuit included in the step-down unit or the step-up unit is formed on a semiconductor substrate, and at least one of a plurality of capacitors forming the charge pump circuit is connected to the exterior of the semiconductor substrate.

6. The step-up/step-down circuit according to claim 4, wherein
   a part of the charge pump circuit included in the step-down unit or the step-up unit is formed on a semiconductor substrate, and at least one of a plurality of capacitors forming the charge pump circuit is connected to the exterior of the semiconductor substrate.

* * * * *